US011611212B2

(12) United States Patent
Lee et al.

(10) Patent No.: US 11,611,212 B2
(45) Date of Patent: Mar. 21, 2023

(54) MODULAR ELECTRICAL ENERGY STORAGE WITH FAULT PROTECTION

(71) Applicant: Kokam Co., Ltd., Suwon-Si (KR)

(72) Inventors: JinWoo Lee, Cheongju-si (KR); Bryon Roos Gomberg, Kfar Sava (IL)

(73) Assignee: Kokam Co., Ltd., Suwon-Si (KR)

( * ) Notice: Subject to any disclaimer, the term of this patent is extended or adjusted under 35 U.S.C. 154(b) by 0 days.

(21) Appl. No.: 17/133,202

(22) Filed: Dec. 23, 2020

(65) Prior Publication Data

US 2021/0203155 A1     Jul. 1, 2021

Related U.S. Application Data

(60) Provisional application No. 62/955,498, filed on Dec. 31, 2019.

(51) Int. Cl.
   *H02J 1/00*           (2006.01)
   *H02J 1/10*           (2006.01)
   *H02J 3/32*           (2006.01)

(52) U.S. Cl.
CPC .............. *H02J 1/002* (2020.01); *H02J 1/102* (2013.01); *H02J 3/32* (2013.01)

(58) Field of Classification Search
CPC .... H02J 1/002; H02J 1/102; H02J 3/32; H02J 7/0013; H02J 7/0031; H02J 7/0045; H02J 7/02; H02J 7/0036; H02J 7/0068; H02J 15/00; H02H 7/26; H02M 1/10
See application file for complete search history.

(56) References Cited

U.S. PATENT DOCUMENTS

2011/0298626 A1    12/2011    Fechalos et al.
2016/0322837 A1*    11/2016    Choi ...................... H02J 3/466
2017/0373512 A1*    12/2017    Wang ..................... B60L 58/19

FOREIGN PATENT DOCUMENTS

WO     2018031719 A1    2/2018

OTHER PUBLICATIONS

May 21, 2021—European Search Report—EP 20217956.0.

* cited by examiner

*Primary Examiner* — Daniel Cavallari
(74) *Attorney, Agent, or Firm* — Banner & Witcoff, Ltd.

(57) ABSTRACT

An apparatus includes a power converter, one or more power source terminal configured to connect to a power source, and one or more load terminal. The apparatus further includes two or more energy storage terminals configured to connect to two or more electrical energy storage devices. Two or more protection circuits, included in the apparatus, one for each of the protection circuits, is electrically connected between the respective energy storage terminal and the power converter. The two or more protection circuits are configured to disconnect the respective terminal from the power converter following a failure of the respective one of the electrical energy storage devices.

20 Claims, 6 Drawing Sheets

○ Connected 331   ⊘ Isolated 332

MODULAR ELECTRICAL ENERGY STORAGE WITH FAULT PROTECTION

CROSS-REFERENCE TO RELATED APPLICATIONS

This application claims priority to U.S. Provisional Application No. 62/955,498 filed Dec. 31, 2019, hereby incorporated by reference in its entirety.

BACKGROUND

The present disclosure relates to the field of energy storage.

Electrical energy storage systems may use storage elements such as batteries, flywheels, fuel cells, thermal storage materials, electrochemical storage materials, flow battery, and kinetic storage materials. Battery electrical storage systems (BESSs) include, for example, large-scale systems for utilities as well as small-scale systems such as mobile chargers. The storage systems may charge from an energy source, such as the grid, a solar power generation system, a wind turbine, a mobile solar panel, a generator, and/or a turbine. The storage system may discharge the energy for consumption by electrical loads when the alternative sources of the loads are, for example, more expensive and/or not available.

SUMMARY

The following is a short summary of some of the inventive concepts for illustrative purposes only and is not an extensive overview, and is not intended to identify key or critical elements or to limit or constrain the inventions and examples in the detailed description. One skilled in the art will recognize other novel combinations and features from the detailed description.

An electrical energy storage system may include multiple energy storage modules connected to a power converter (such as an inverter, power supply, DC/DC converter, or a bidirectional inverter), where each module may be connected with an independent physical and electrical connection. The inverter may include separate protection circuit boards for each storage module connection terminal set. Multiple protection circuits may be included in the inverter. Each protection circuit may include multiple sensors for detecting failure of the storage module, or a communication circuit for receiving a notification of a failure. The electrical configurations between the inverter and modules may use a bus configuration.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures. In the drawings, like numerals reference similar elements.

DETAILED DESCRIPTION

The accompanying drawings, which form a part hereof, show examples of the disclosure. It is to be understood that the examples shown in the drawings and/or discussed herein are non-exclusive and that there are other examples of how the disclosure may be practiced. As used herein, the term "or" means non-exclusive or (and/or) and may include any combination of the listed items.

Disclosed herein are methods, devices, and systems for modular and portable electrical energy storage with independent electrical and mechanical connections for each energy storage module. Multiple energy storage modules may share a common power device in a stackable configuration, increasing portability. Each energy storage module may be electrically and mechanically connected to the power device with a separate electrical and mechanical connection, such as a star configuration. Electrical energy storage modules may use storage elements, such as batteries, flywheels, fuel cells, flow battery, thermal storage materials, electrochemical storage materials, and kinetic storage materials. For example, in a battery energy storage system (BESS) each battery module may have a separate cable connecting it to the power device. For example, separate electrical conductors may be incorporated into support feet and transect the device, such as the power device or the battery module. For example, the circuit board of the power device may electrical connect to 4 support feet, one at each corner of the device, and each battery module may be electrically connected to one of the support feet. In this example, 4 battery modules may be connected to the power device. Other example systems may include 5, 6, 8, or 10 feet, and therefore allow up to 10 energy storage modules. The system may incorporate between 2 and 20 support feet, each combined with a conductor. BESSs may be used as a primary example in this disclosure, but may be understood that alternative electrical energy storage systems may be used instead of BESSs.

The inverter may include separate protection circuit boards for each storage module connection terminal set ("terminal set"), such as a positive terminal and negative terminal in a terminal set. Multiple protection circuits may be included in the inverter, such as within a terminal set, between terminal sets, between the terminal set and the power converter circuit, and within the power converter circuit. As used herein, a terminal means a set of conductors for transferring electrical power. Each protection circuit may include multiple sensors for detecting failure of the storage module, or a communication circuit for receiving a notification of a failure. The electrical configuration between the inverter and modules may include a star configuration or a bus configuration for power delivery. A star configuration may have separate electrical conductors between the inverter and each module. A bus configuration may have common electrical conductors between the inverter and each module. Hybrid configurations (combining star and bus features) may be used for BESSs Reference is now made to FIG. 1, which shows a block diagram of an example system 100 with modular electrical energy storage. A power device 102 may be connected to a power source 101, such as a power generation system, a power harvesting system, an electrical network, a large electrical energy storage system, or a grid. Power device 102 is connected to multiple energy storage modules 104A, 104B, . . . up to 104n using separate electrical/mechanical connectors 103A, 103B, . . . up to 103n respectively. Power device 102 may be connected to loads 106, 107, and/or 108 through one or more alternating current (AC) or direct current (DC) connection terminals. Power device 102 may transfer power from energy storage modules 104A-104n to loads 106-108 when power source 101 does not provide power to loads 106-108. Power transfer may be performed using an inverter circuit configured to provide AC power, or a converter circuit configured to provide DC power to loads 106-108. By selectively discharging each energy storage module to loads 106-108, power device 102 may manage depletion of energy storage modules 104A-104n in parallel or one at a time (depleting one before drawing power from the next). When power source 101 provides power, power device 102 may direct power to loads 106-108 and/or to energy storage modules 104A-104n.

Figure 1:
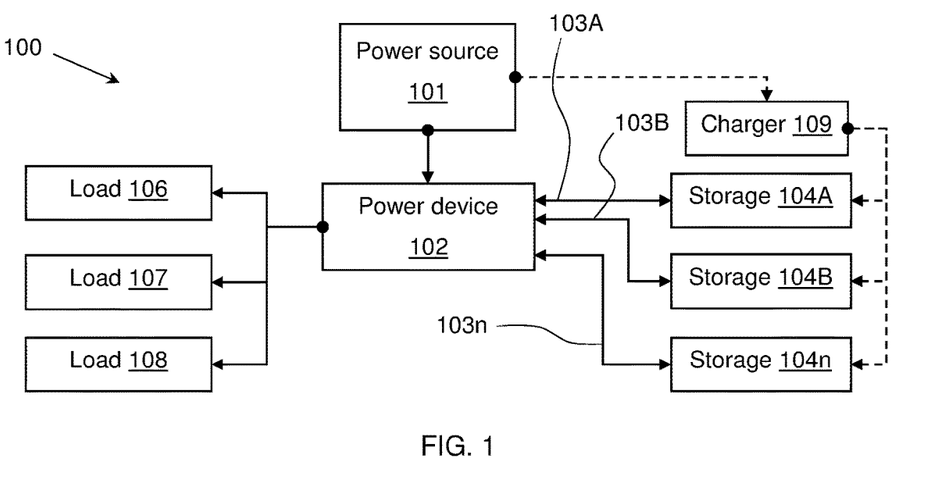
FIG. 1 shows a block diagram of an example system with modular electrical energy storage.

A charger 109 may be connected to the same power source 101 or a different power source. Charger 109 may be connected to energy storage modules 104A-104n independently from connections 103A-103n, and charger 109 may be configured to charge one or more of energy storage modules 104A-104n independently from power device 102. For example, when power device 102 is charging one set of energy storage modules, charger 109 may charge a second set. For example, when power device is rated for 50 amperes (A), and charging a set of energy storage modules at full charge rate requires 80 A, charger 109 may be used to provide an additional 30 A of charging current.

Figure 2A:
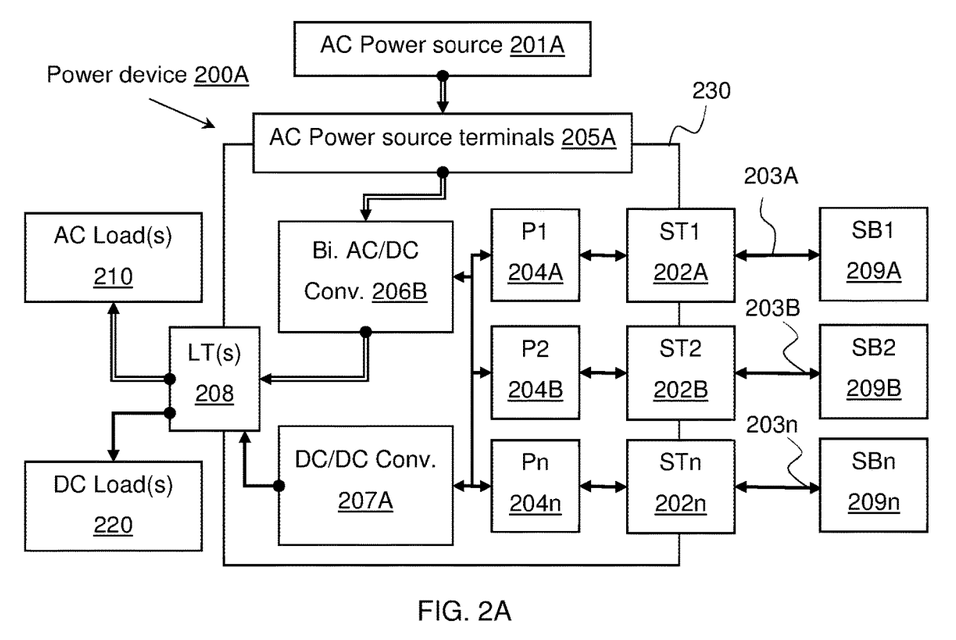
FIG. 2A shows a block diagram of an example power device for modular electrical energy storage with an alternating current source.
Figure 2B:
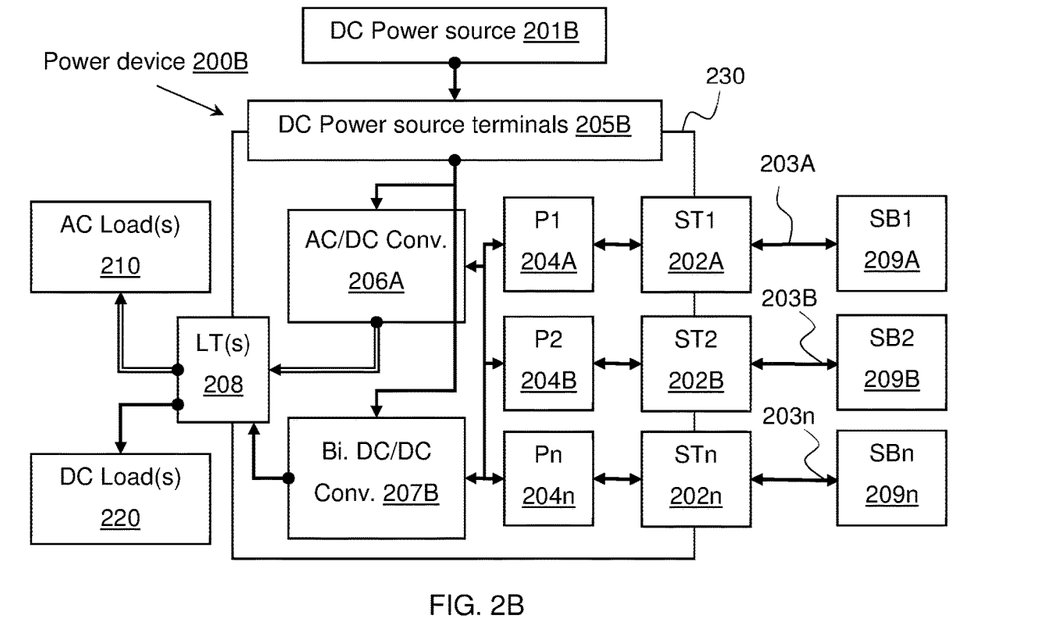
FIG. 2B shows a block diagram of an example power device for modular electrical energy storage with a direct current source.
Figure 2C:
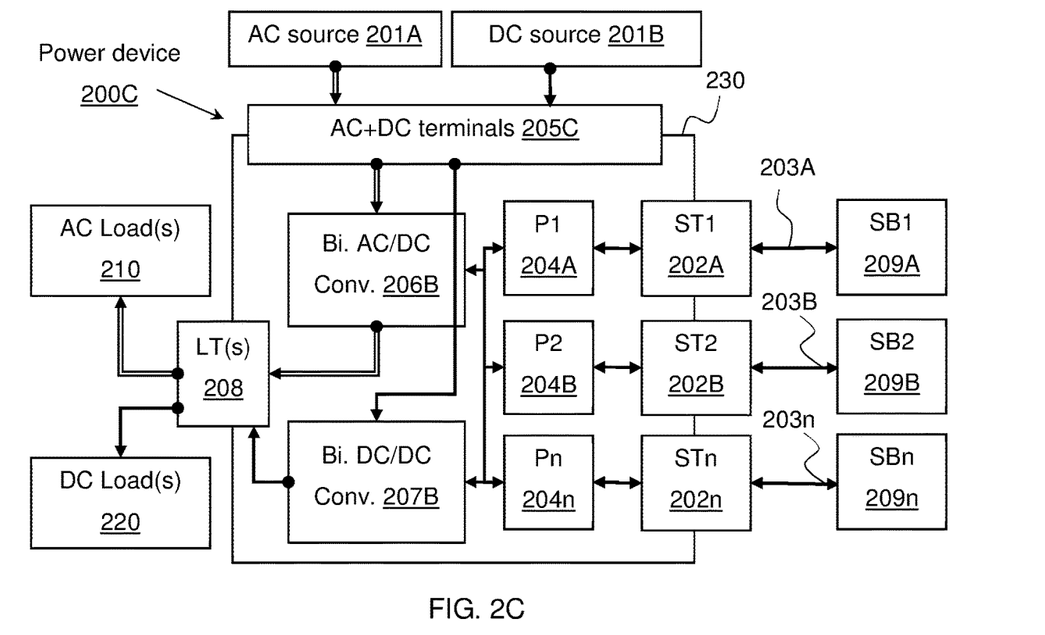
FIG. 2C shows a block diagram of an example power device for modular electrical energy storage with an alternating current source and a direct current source.

Reference is now made to FIGS. 2A, 2B, and 2C, which show block diagrams of an example power device 200A, 200B, and 200C for modular energy storage with different power sources. Power device 200A, 200B, and 200C may include a housing 230. Power device 200A may include AC power source terminals 205A configured to connect to an AC power source 201A, such as power source as power source 101 of FIG. 1 in a AC configuration. Power device 200A may include a bidirectional AC/DC converter 206B connected electrically to AC power source terminals 205A and/or a DC/DC converter 207A. Power device 200A, 200B and 200C may include multiple independent storage terminals 202A-202n (illustrated subset 202A, 202B, . . . 202n) configured to connect to storage conductors 203A-203n and storage batteries 209A, 209B, . . . 209n. Protection circuits 204A-204n are positioned between terminals 202A-202n and converters 206B and 207A. Protection circuits 204A-204n are configured to sense the malfunctions of each storage device (not shown) connected to terminals 202A-202n, such as electrical or physical parameters (e.g. voltage, current, impedance, temperature, electromagnetic emissions, chemical emissions, frequency response, or transmission line reflection amplitude). For example, a protection circuit may include multiple sensors configured to detect a failure condition. For example, a sensor may comprise a power source and threshold circuit configured to send a binary analog or digital signal. For example, a protection circuit may be a communication circuit configured to receive a notification of a failure condition, such as a notification from a storage module, a server, or a home energy management system. Power device 200A. 200B, and 200C may include load terminals 208 configured to connect to one or more AC loads 210 or one or more DC loads 220. As used herein, a terminal means a set of conductors for transferring electrical power. The connector arrows between components (such as 203A-203n) indicate the direction of current flow, a single line indicates a DC connection, and a double line indicates an AC connection.

Power device 200B may include DC power source terminals 205B configured to connect to an DC power source 201B, such as power source 101 of FIG. 1 in a DC configuration. Power device 200B may include an AC/DC converter 206A and/or a bidirectional DC/DC converter 207B both connected electrically to DC power source terminals 205B. Protection circuits 204A-204n of power device 200B are positioned between terminals 202A-202n and converters 206A and 207B.

Power device 200C may include AC+DC power source terminals 205C configured to connect to AC power source 201A and DC power source 201B, such as power source 101 of FIG. 1 in a combined AC+DC configuration. Power device 200C may include a bidirectional AC/DC converter 206B and/or a bidirectional DC/DC converter 207B both connected electrically to AC+DC power source terminals 205C. Protection circuits 204A-204n of power device 200C are positioned between terminals 202A-202n and converters 206B and 207B.

Figure 3A:
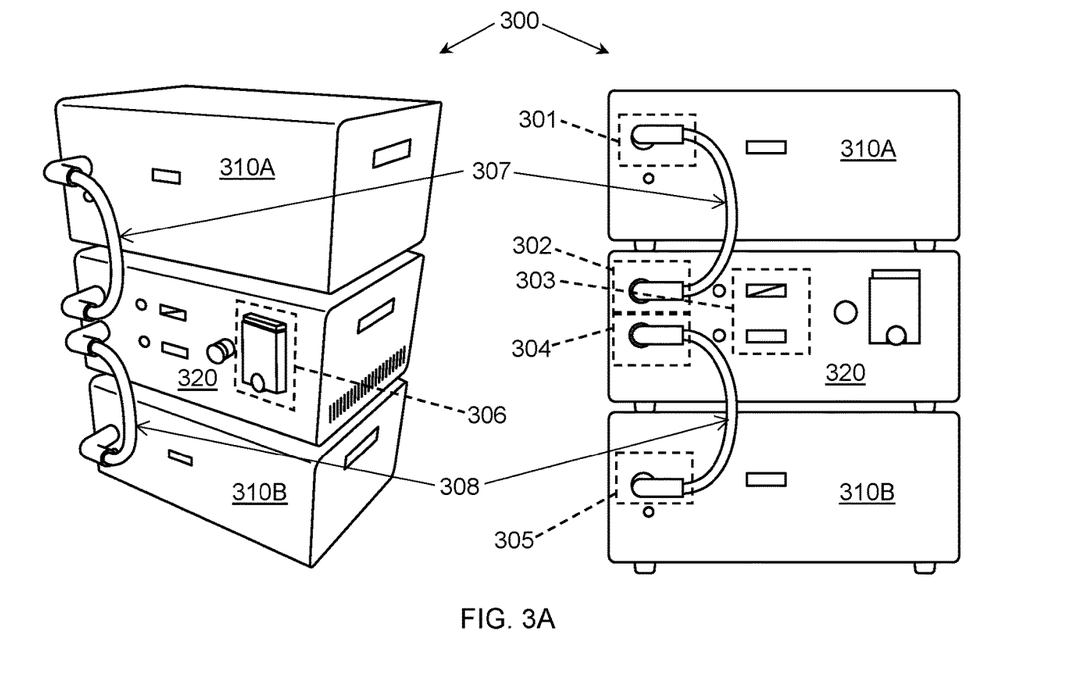
FIG. 3A shows two views of an example system with modular energy electrical storage.

Reference is now made to FIG. 3A, which shows two views of an example system 300 with modular electrical energy storage. System 300 may comprise a power device 320 and energy storage modules 310A and 310B. A first power conductor 307 may connect a terminal 301 of energy storage module 310A to a storage terminal 302 of power device 320. A second power conductor 308 may connect a terminal 305 of energy storage module 310B to a storage terminal 304 of power device 320. Power device 320 may include one or more user interfaces 303, and auxiliary power terminal 306.

Figure 3B:
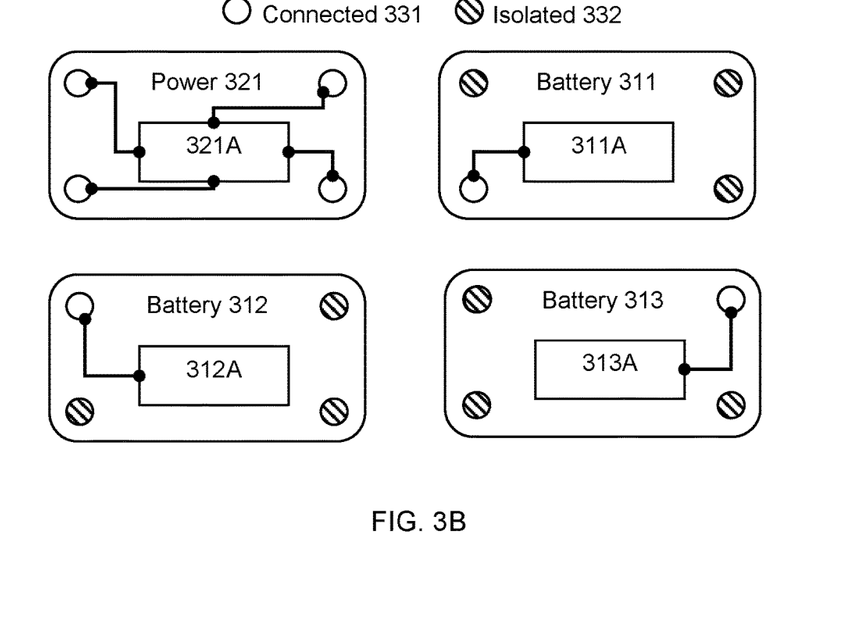
FIG. 3B shows a top view of an example system with modular electrical energy storage and arrangement of conducting and isolating legs.
Figure 3C:
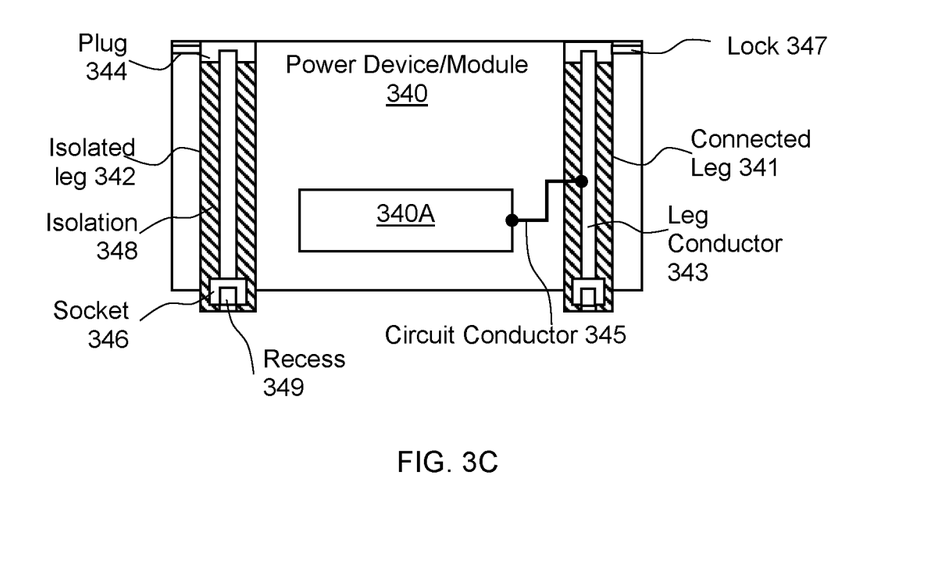
FIG. 3C shows a side view of an example device with details of conducting and isolating legs.

Reference is now made to FIG. 3B, which shows a top view of an example system with modular electrical energy storage and arrangement of connected legs 331 and isolated legs 332. Connected legs 331 and isolated legs 332 may be used to mechanically support the device or modules (such as when placed on surfaces), and used to transfer electrical and mechanical connections between energy storage modules (e.g. batteries) 311, 312, and 313, to power device 321. Each leg may extend the height of the device enclosure, and may protrude below the enclosure on the bottom side for supporting the device when placed on a flat surface. The top of each leg may be flush with the enclosure or recessed to allow a second device (such as one of 311, 312, and 313) to be placed on top of the first (bottom) device to electrically and mechanically connect to the first device, thereby the legs of the first device and the second device forming a conductor, such as storage conductors 203A, 203B, . . . 203n. Each leg includes a conductor, a plug, a socket and a connection terminal, as shown in FIG. 3C. A power device 321 may include a circuit board 321A (such as the circuit board of power devices 200A, 200B, and 200C) with terminals (such as terminals ST1 202A, ST2 202B, . . . STn 202*n*) electrically connected to each connected leg 331 (such as storage conductors 203A, 203B, . . . 203*n*). An energy storage module 311 may include a circuit board 311A with a terminal connected to one of the legs (bottom left), such as storage conductor 203A. An energy storage module 312 may include a circuit board 312A with a terminal connected to a second one of the legs (top left), such as storage conductor 203B. An energy storage module 313 may include a circuit board 313A with a terminal connected to a third one of the legs (top right), such as storage conductor 203*n*. The configuration of the connected legs provides separate (e.g. independent mechanically and electrically) isolated conductors (such as storage conductors 203A, 203B, . . . 203*n*) for connecting each energy storage module to the power device through one of the leg pillars (the series of legs located one on top of the other).

Reference is now made to FIG. 3C, which shows a side view of an example device 340 (such as power devices 200A, 200B, and 200C or batteries 3011, 312, and 313) with details of connected leg 341 and isolated leg 342. Power device/module 340 may include a circuit board 340A (such as the circuit board of power devices 200A, 200B, and 200C or batteries 3011, 312, and 313). Each leg includes a plug 344, socket 346, and conductor 343 electrically connecting plug 344 and socket 346. Socket 346 includes a recess 349 to accept a plug from another device below (not shown), and plug is recessed to connect to a socket of the device above (not shown). Conductor 343 of each leg is enclosed in isolation material 348 to prevent short circuits. Isolation material 348 provides electrical isolation and mechanical support for the device, such as typically performed by rubber legs attached to the bottom of the device. Recesses (e.g. 349) of plug 344 and socket 346 provide some protection from accidental contact with socket 346 or plug 344. Circuit conductor 345 electrically connects circuit 340A to leg conductor 343 (e.g. directly, through socket, or through plug), such as storage conductors 203A, 203B, . . . 203*n*. Lock 347 may connect plug and socket to prevent separation of these during operation. Lock 347 may also include a cover to protect plug from accidental contact. Storage conductors 203A, 203B, . . . 203*n* are formed by the leg conductors 343 of the stack of devices (such as the device 340, the device above, the device below, etc.), thereby forming a stack of the conductors of the connected legs 343 and the isolated legs 342.

Figure 4:
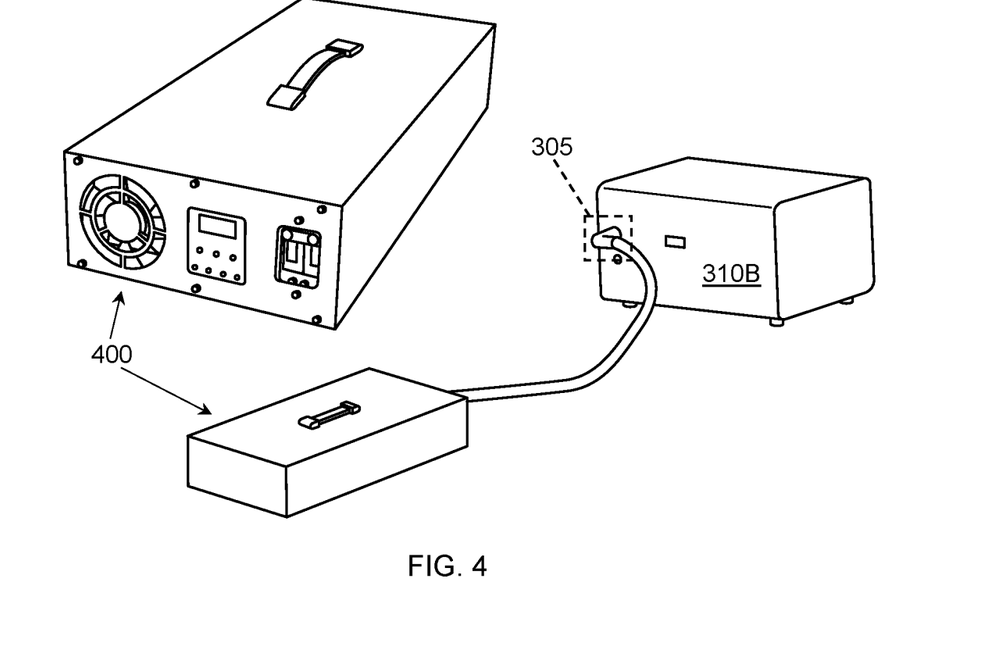
FIG. 4 shows two views of an example charger for modular electrical energy storage.

Reference is now made to FIG. 4, which shows two views of an example charger 400 for modular electrical energy storage. Charger 400 may be connected to an AC or DC power source and to a charge/discharge port 305 of energy storage module (e.g. 310B). A separate charger 400 may allow swapping energy storage modules at a remote location and charging them at a power source located at a second location.

Figure 5:
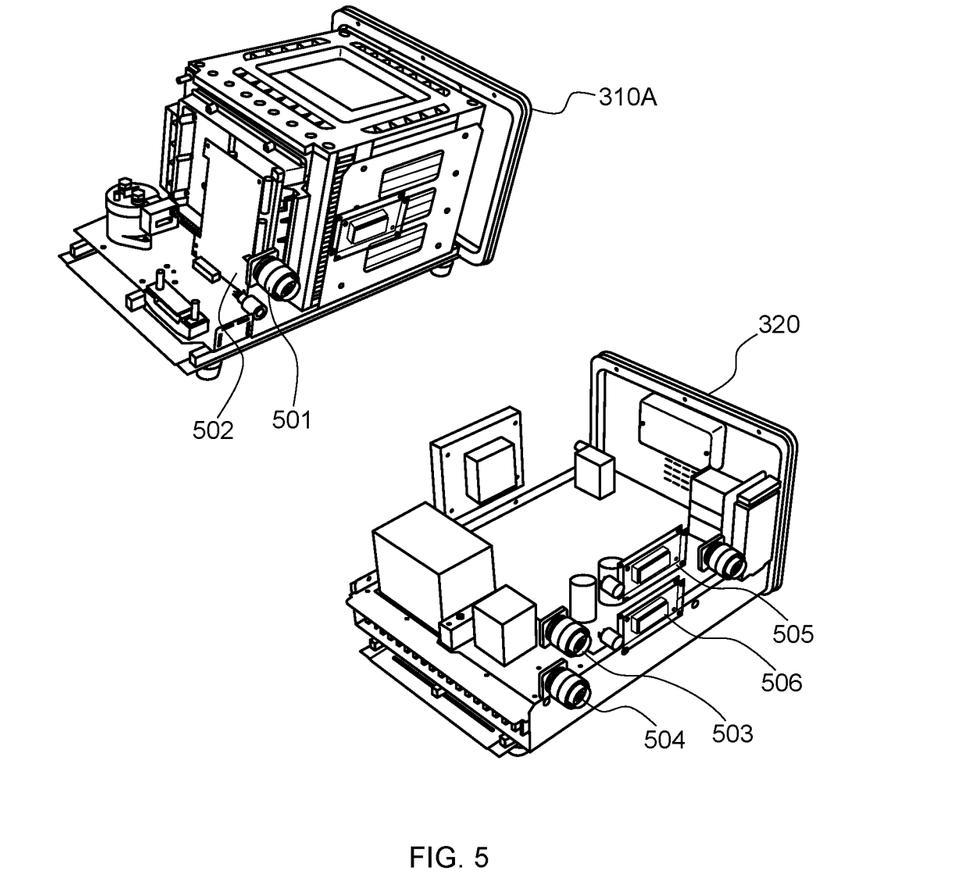
FIG. 5 shows, schematically, internal configuration of an example battery module and an example power device.

Reference is now made to FIG. 5, which shows, schematically, internal configuration of an example energy storage module 310A and an example power device 320. Energy storage module 310A internal components may include a connecter 501 (such as terminals ST1 202A, ST2 202B, . . . STn 202*n*) and a protection circuit 502 (such as 204A-204*n*). Power device 320 may include connectors 503 and 504, each connected to protection circuits 505 and 506, respectively. This example shows two connectors for energy storage modules, but any number of connectors can be incorporated into the power device as separate electrical and mechanical connectors. Providing separate circuit boards for protection circuits 505 and 506 may further protect the power device and other energy storage modules in case of failure of one or more of the energy storage modules. For example, when an energy storage module connected to connector 503 (using a terminal such as 202A of FIG. 2) causes a short circuit, the protection circuit 505 may disconnect connector 503 from the circuit board of power device 320 thus preventing failure of the main circuit of power device 320.

Figure 6:
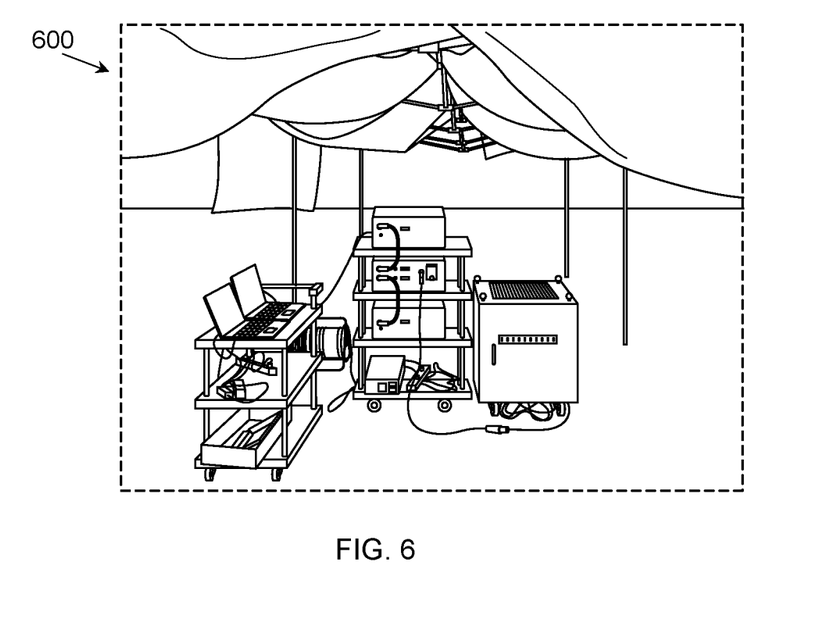
FIG. 6 shows an example system with modular electrical energy storage during testing.

Reference is now made to FIG. 6, which shows an example system 600 with modular electrical energy storage during testing.

Figure 7:
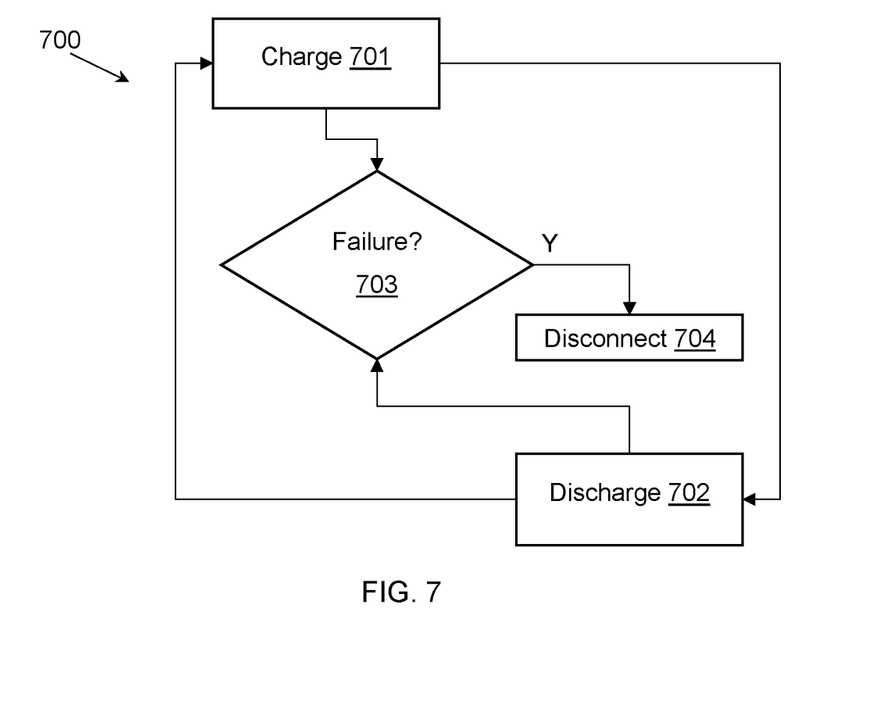
FIG. 7 shows a flowchart of an example method for modular electrical energy storage operation.

Reference is now made to FIG. 7, which shows a flowchart of an example method for modular electrical energy storage operation. A power device (such as power devices 102, 200, 320, 340, or 400), may cycle between charge and discharge states as at step 701 and 702 respectively. Following a failure as at step 703, the energy storage module (such as 104A, 104B, 104C, 310A, 310B, 311, 312, or 313) that failed may be disconnected 704 from the power device using a separate protection circuit (such as 204A, 204B, 204C, 502, 505, or 506) for each energy storage module. Protection circuits at the power device and the energy storage module allow redundant protection to improve uninterrupted power deliver to the loads.

Specific dimensions, specific materials, specific ranges, specific resistivities, specific voltages, specific shapes, and/or other specific properties and values disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter. For example, the disclosure of a first value and a second value for a given parameter can be interpreted as disclosing that any value between the first and second values could also be employed for the given parameter. For example, if parameter X is exemplified herein to have value A and exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

In the description of various illustrative features, reference is made to the accompanying drawings, which form a part hereof, and in which is shown, by way of illustration, various features in which aspects of the disclosure may be practiced. It is to be understood that other features may be utilized and structural and functional modifications may be made, without departing from the scope of the present disclosure.

Terms such as "multiple" as used in this disclosure indicate the property of having or involving several parts, elements, or members.

It may be noted that various connections are set forth between elements herein. These connections are described in general and, unless specified otherwise, may be direct or indirect; this specification is not intended to be limiting in this respect, and both direct and indirect connections are envisioned. Further, elements of one feature in any of the embodiments may be combined with elements from other features in any of the embodiments, in any combinations or sub-combinations.

All described features, and modifications of the described features, are usable in all aspects of the inventions taught herein. Furthermore, all of the features, and all of the modifications of the features, of all of the embodiments described herein, are combinable and interchangeable with one another.

Clauses:

Clause 1. An apparatus, comprising:
a power converter;
at least one power source terminal configured to connect to a power source;
at least one load terminal;
a plurality of energy storage terminals configured to connect to a plurality of electrical energy storage devices; and
a plurality of protection circuits, wherein each of the plurality of protection circuits is electrically connected between a respective one of the plurality of energy storage terminals and the power converter, wherein the plurality of protection circuits are configured to disconnect the respective terminal from the power converter following a failure of the respective one of the plurality of electrical energy storage devices.

Clause 2. The apparatus of Clause 1, wherein the power converter comprises an AC/DC or a DC/AC converter.

Clause 3. The apparatus of any one of Clause 1 or 2, wherein the power converter comprises a DDC converter.

Clause 4. The apparatus of any one of Clauses 1 to 3, wherein each of the plurality of protection circuits comprises at least one sensor configured for detecting the failure.

Clause 5. The apparatus of any one of Clauses 1 to 4, wherein each of the plurality of protection circuits comprises a communication circuit for receiving a notification of failure from the respective one of the plurality of electrical energy storage devices.

Clause 6. The apparatus of any one of Clauses 1 to 5, wherein the electrical energy storage devices comprise at least one storage element selected from the group consisting of batteries, thermal storage materials, kinetic storage materials, fuel cell, flow batteries, and electrochemical storage materials.

Clause 7. A system comprising:
a plurality of electrical energy storage modules;
at least one load;
a power source; and
a power device, comprising:
a converter circuit,
a plurality of storage terminals configured to connect to each of the plurality of electrical energy storage modules,
a plurality of protection circuits electrically connected between the respective one of the plurality of storage terminals and the converter circuit, wherein the plurality of protection circuits are configured to disconnect the respective terminal from the converter circuit following a failure of the respective one of the plurality of electrical energy storage modules.

Clause 8. The system of Clause 7, wherein the power device comprises an AC/DC or a DC/AC converter.

Clause 9. The system of any one of Clauses 7 or 8, wherein the power device comprises a DC/DC converter.

Clause 10. The system of any one of Clauses 7 to 9, wherein each of the plurality of protection circuits comprises at least one sensor configured for detecting the failure.

Clause 11. The system of any one of Clauses 7 to 10, wherein each of the plurality of protection circuits comprises a communication circuit for receiving a notification of failure from the respective one of the plurality of electrical energy storage modules.

Clause 12. The system of any one of Clauses 7 to 11, wherein the electrical energy storage modules comprise at least one storage element selected from the group consisting of batteries, thermal storage materials, kinetic storage materials, fuel cell, flow batteries, and electrochemical storage materials.

Clause 13. A method, comprising:
discharging a plurality of electrical energy storage devices to at least one load using a plurality of energy storage terminals and at least one load terminal;
charging the plurality of electrical energy storage devices using a power source connected to a power source terminal of a power converter;
wherein each of a plurality of protection circuits is electrically connected between a respective one of the plurality of energy storage terminals and the power converter, and
following a failure of a respective one of the plurality of protection circuits, disconnecting the respective terminal from the power converter.

Clause 14. The method of Clause 13, wherein the power converter comprises an AC/DC or a DC/AC converter.

Clause 15. The method of any one of Clauses 13 or 14, wherein the power converter comprises a DDC converter.

Clause 16. The method of any one of Clauses 13 to 15, wherein each of the plurality of protection circuits comprises at least one sensor configured for detecting the failure.

Clause 17. The method of any one of Clauses 13 to 16, wherein each of the plurality of protection circuits comprises a communication circuit for receiving a notification of failure from the respective one of the plurality of electrical energy storage devices.

Clause 18. The method of any one of Clauses 13 to 7, wherein the electrical energy storage devices comprise at least one storage element selected from the group consisting of batteries, thermal storage materials, kinetic storage materials, fuel cell, flow batteries, and electrochemical storage materials.

Clause 19. An apparatus, comprising:
an enclosure;
a power converter;
at least one power source terminal configured to connect to a power source;
at least one load terminal;
a plurality of legs, wherein at least one leg of the plurality of legs comprises:
an electrical plug,
an electrical socket,
a conductor electrically connecting the electrical plug and the electrical socket, and
an isolating material encasing at least part of the leg;
wherein the leg extends the height of the enclosure,
wherein at least part of the isolating material and at least part of the electrical socket protrude from a bottom side of the enclosure,
wherein the electrical plug and the electrical socket are on opposite ends of the leg.

Clause 20. The apparatus of Clause 19, wherein the conductor is electrically connected to the power converter.

Clause 21. The apparatus of any one of Clause 19 or 20, wherein the power converter comprises an AC/DC converter, a DC/DC converter, or a DC/AC converter.

Clause 22. The apparatus of any one of Clauses 19 to 21, further comprising a protection circuit, wherein the protection circuit is electrically connected between the conductor and the power converter, wherein the protection circuit is configured to disconnect the power converter from the conductor following a failure of a device connected to the electrical socket or the electrical plug.

Clause 23. The apparatus of Clause 22, wherein the protection circuit comprises at least one sensor configured for detecting the failure.

Clause 23. The apparatus of any one of Clauses 22 to 23, wherein the protection circuit comprises a communication circuit for receiving a notification of failure from an electrical energy storage devices.

Clause 24. An apparatus, comprising:
an enclosure;
an electrical energy storage device;
a plurality of legs, wherein at least one leg of the plurality of legs comprises:
an electrical plug,
an electrical socket,
a conductor electrically connecting the electrical plug and the electrical socket, and
an isolating material encasing at least part of the leg;
wherein the leg extends the height of the enclosure,
wherein at least part of the isolating material and at least part of the electrical socket protrude from a bottom side of the enclosure,
wherein the electrical plug and the electrical socket are on opposite ends of the leg.

Clause 25. The apparatus of Clause 24, wherein the conductor is electrically connected to the electrical energy storage device.

Clause 26. The apparatus of any one of Clause 24 or 25, wherein the electrical energy storage devices comprise at least one storage element selected from the group consisting of batteries, thermal storage materials, kinetic storage materials, fuel cell, flow batteries, and electrochemical storage materials.

Clause 27. The apparatus of any one of Clauses 24 to 26, further comprising a communication circuit for sending a notification of failure of the electrical energy storage device to another device.

Clause 28. The apparatus of any one of Clauses 24 to 27, further comprising a protection circuit, wherein the protection circuit is electrically connected between the conductor and the electrical energy storage devices, wherein the protection circuit is configured to disconnect the electrical energy storage devices from the conductor following a failure of a device connected to the electrical socket or the electrical plug.

Clause 29. The apparatus of Clause 28, wherein the protection circuit comprises at least one sensor configured for detecting the failure.

Clause 30. The apparatus of any one of Clauses 1 to 6, further comprising:
an enclosure;
a plurality of legs, wherein at least one leg of the plurality of legs incorporates a terminal of the plurality of energy storage terminals, wherein the at least one leg comprises:
an electrical plug,
an electrical socket,
a conductor electrically connecting the terminal, the electrical plug, and the electrical socket, and
an isolating material encasing at least part of the leg;
wherein the leg extends the height of the enclosure,
wherein at least part of the isolating material and at least part of the electrical socket protrude from a bottom side of the enclosure,
wherein the electrical plug and the electrical socket are on opposite ends of the leg.

Clause 31. The apparatus of Clause 30, wherein the terminal is electrically connected to the power converter.

What is claimed is:

1. An apparatus, comprising:
a power converter comprising a bidirectional alternating current (AC)/direct current (DC) converter;
an AC power source terminal configured to connect to an AC power source;
at least one AC load terminal;
a plurality of DC energy storage terminals configured to connect to a plurality of electrical energy storage devices;
a plurality of protection circuits, wherein each of the plurality of protection circuits is electrically connected between a respective one of the plurality of DC energy storage terminals and the power converter, wherein the plurality of protection circuits are configured to disconnect the respective terminal from the power converter following a failure of the respective one of the plurality of electrical energy storage devices;
an enclosure; and
a plurality of legs, wherein at least one leg of the plurality of legs incorporates a terminal of the plurality of DC energy storage terminals, wherein the at least one leg comprises:
an electrical plug,
an electrical socket,
a conductor electrically connecting the terminal, the electrical plug, and the electrical socket, and
an isolating material encasing at least part of the leg;
wherein the leg extends the height of the enclosure,
wherein at least part of the isolating material and at least part of the electrical socket protrude from a bottom side of the enclosure, and
wherein the electrical plug and the electrical socket are on opposite ends of the leg.

2. The apparatus of claim 1, wherein the power converter further comprises
a DC/DC converter, and
a DC power source terminal configured to connect to a DC power source.

3. The apparatus of claim 1, wherein the power converter further comprises
a DC/DC converter, and
at least one DC load terminal.

4. The apparatus of claim 1, wherein each of the plurality of protection circuits comprises at least one sensor configured for detecting the failure.

5. The apparatus of claim 1, wherein each of the plurality of protection circuits comprises a communication circuit for receiving a notification of failure from the respective one of the plurality of electrical energy storage devices.

6. The apparatus of claim 1, wherein the electrical energy storage devices comprise at least one storage element selected from the group consisting of batteries, thermal storage, kinetic storage, fuel cell, flow batteries, and electrochemical storage.

7. The apparatus of claim 1, wherein the terminal is electrically connected to the power converter.

8. A system comprising:
a plurality of DC electrical energy storage modules;
at least one AC load;
an AC power source; and
a power device, comprising:
  a bidirectional AC/DC converter circuit,
  a plurality of DC storage terminals configured to connect to each of the plurality of DC electrical energy storage modules,
  a plurality of protection circuits electrically connected between the respective one of the plurality of DC storage terminals and the bidirectional AC/DC converter circuit, wherein the plurality of protection circuits are configured to disconnect the respective terminal from the bidirectional AC/DC converter circuit following a failure of the respective one of the plurality of DC electrical energy storage modules;
  an enclosure; and
  a plurality of legs, wherein at least one leg of the plurality of legs incorporates a terminal of the plurality of DC storage terminals, wherein the at least one leg comprises:
  an electrical plug,
  an electrical socket,
  a conductor electrically connecting the terminal, the electrical plug, and the electrical socket, and
  an isolating material encasing at least part of the leg;
  wherein the leg extends the height of the enclosure,
  wherein at least part of the isolating material and at least part of the electrical socket protrude from a bottom side of the enclosure, and
  wherein the electrical plug and the electrical socket are on opposite ends of the leg.

9. The system of claim 8, wherein the power device further comprises
  a DC/DC converter configured to supply DC power to the plurality of DC storage terminals; and
  a DC power source terminal configured to connect to a DC power source to the DC/DC converter.

10. The system of claim 9, wherein the DC power source is at least one of a photovoltaic power generator, a fuel cell, a DC generator, or a DC-connected wind turbine.

11. The system of claim 8, wherein each of the plurality of protection circuits comprises at least one sensor configured for detecting the failure.

12. The system of claim 8, wherein each of the plurality of protection circuits comprises a communication circuit for receiving a notification of failure from the respective one of the plurality of DC electrical energy storage modules.

13. The system of claim 8, wherein the plurality of DC electrical energy storage modules comprise at least one storage element selected from the group consisting of batteries, thermal storage, kinetic storage, fuel cell, flow batteries, and electrochemical storage.

14. A method, comprising:
discharging a plurality of electrical energy storage devices to at least one AC load using a plurality of DC energy storage terminals, at least one AC load terminal, and a power converter, the power converter comprising a bidirectional AC/DC converter;
charging the plurality of electrical energy storage devices using an AC power source and the power converter;
wherein each of a plurality of protection circuits is electrically connected between a respective one of the plurality of DC energy storage terminals and the power converter, and
wherein following a failure of a respective one of the plurality of protection circuits, disconnecting the respective terminal from the power converter,
wherein the power converter comprises an enclosure and a plurality of legs, and
wherein the charging and discharging are performed using the plurality of legs, wherein at least one leg of the plurality of legs incorporates a terminal of the plurality of DC energy storage terminals, wherein the at least one leg comprises:
an electrical plug,
an electrical socket,
a conductor electrically connecting the terminal, the electrical plug, and the electrical socket, and
an isolating material encasing at least part of the leg;
wherein the leg extends the height of the enclosure,
wherein at least part of the isolating material and at least part of the electrical socket protrude from a bottom side of the enclosure, and
wherein the electrical plug and the electrical socket are on opposite ends of the leg.

15. The method of claim 14, wherein the power converter further comprises
  a DC/DC converter, and
  a DC power source terminal configured to connect to a DC power source.

16. The method of claim 14, wherein the power converter further comprises
  a DC/DC converter configured to supply DC power to the plurality of DC storage terminals; and
  at least one DC load terminal configured to connect to a DC power source to the DC/DC converter.

17. The method of claim 14, wherein each of the plurality of protection circuits comprises at least one sensor configured for detecting the failure.

18. The method of claim 14, wherein each of the plurality of protection circuits comprises a communication circuit for receiving a notification of failure from the respective one of the plurality of electrical energy storage devices.

19. The method of claim 14, wherein the electrical energy storage devices comprise at least one storage element selected from the group consisting of batteries, thermal storage, kinetic storage, fuel cell, flow batteries, and electrochemical storage.

20. The method of claim 16, wherein the DC power source is at least one of a photovoltaic power generator, a fuel cell, a DC generator, or a DC-connected wind turbine.

* * * * *